United States Patent [19]

Fancy et al.

[11] 4,254,344
[45] Mar. 3, 1981

[54] TURBINE START-UP SWITCH

[75] Inventors: Thomas A. Fancy, Westminster; Vesa I. Aunio; John W. Capitao, both of Fitchburg, all of Mass.

[73] Assignee: General Electric Company, Lynn, Mass.

[21] Appl. No.: 86,705

[22] Filed: Oct. 22, 1979

[51] Int. Cl.³ ............................................. H01H 35/06
[52] U.S. Cl. ..................................... 307/86; 307/120; 307/64; 290/40 A
[58] Field of Search ................... 307/86, 87, 129, 126, 307/120, 64, 66, 68, 43, 80, 81; 290/40 A, 30 A, 50; 415/30, 36; 322/38

[56] References Cited
U.S. PATENT DOCUMENTS 2,011,859  8/1935  Kalin ................................. 290/40 A
3,753,069  8/1973  Newton .......................... 307/64 X Primary Examiner—L. T. Hix
Assistant Examiner—James L. Dwyer
Attorney, Agent, or Firm—James W. Mitchell

[57] ABSTRACT

A prime mover which is equipped with an electric speed governor may produce adequate electrical power output through a shaft driven permanent magnet alternator to run the electric speed governor. However, initially an auxiliary power source must be connected to the electric governor until the permanent magnet alternator becomes self-sustaining. The present invention is an electrical circuit which will automatically provide start-up power from an auxiliary source and then switch to the permanent magnet alternator. Certain safety interlocks are provided in case of speed pick-up failure.

7 Claims, 3 Drawing Figures

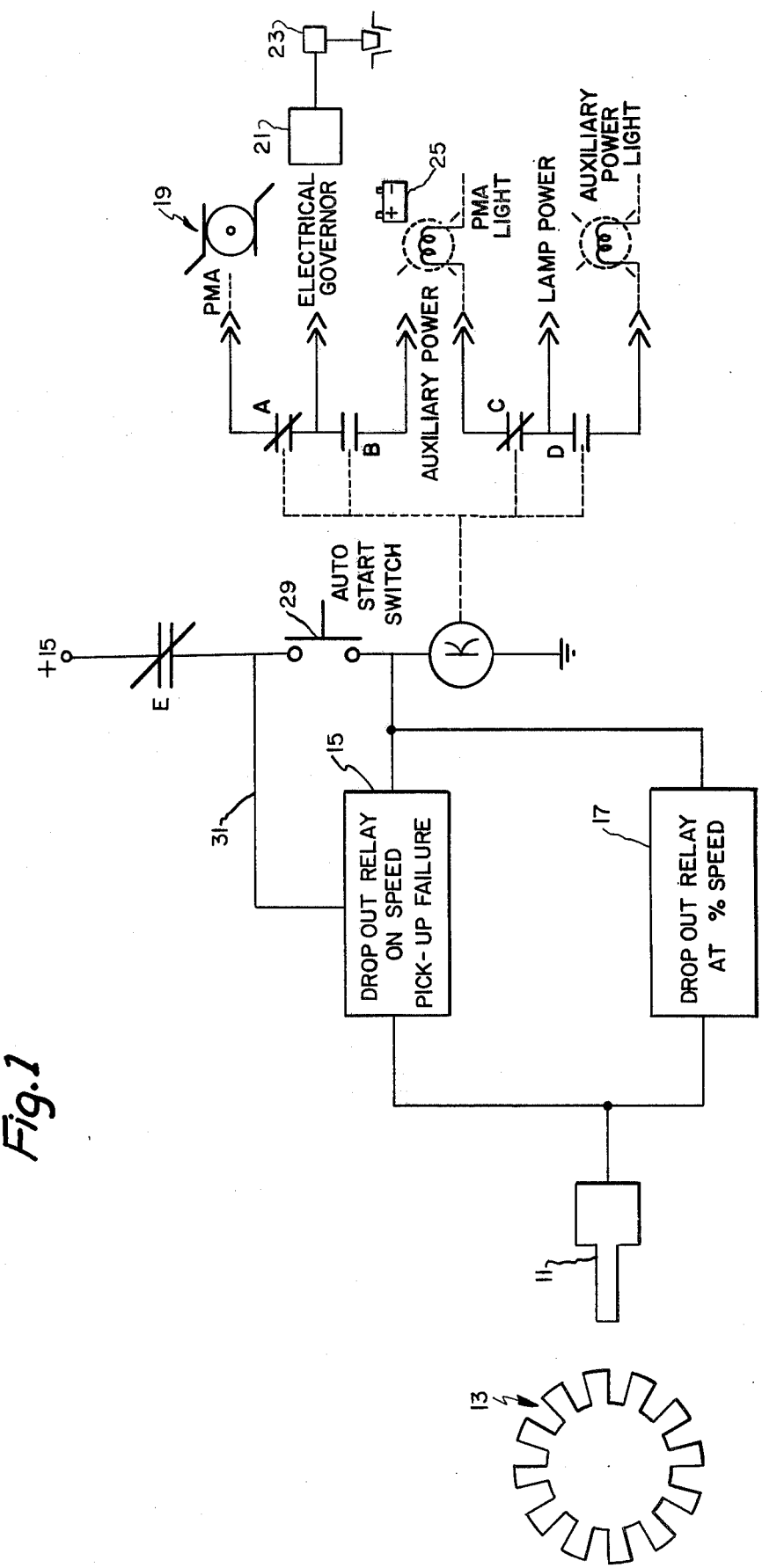

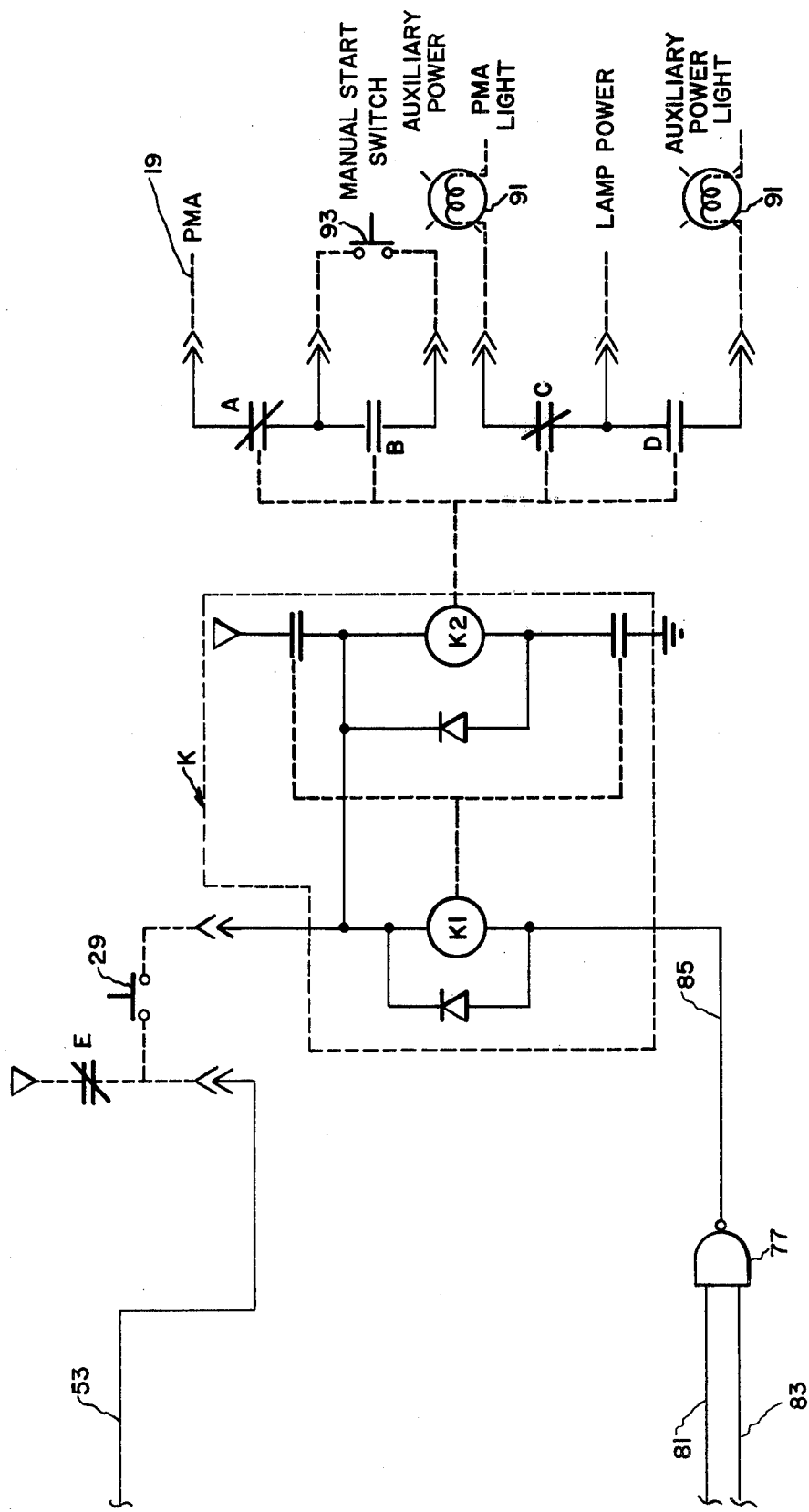

TURBINE START-UP SWITCH

BACKGROUND OF THE INVENTION

This invention relates to fluid driven prime movers and in particular to a start-up switch which applies auxiliary power to a electric speed governor until the prime mover can generate its own electric power.

It is well known that an electric speed governor may be used to control the speed of a prime mover. When the prime mover is at a sufficient speed to generate electric power an electric speed governor may be powered internally; that is, from a power source driven by the prime mover. This power source may be a permanent magnet alternator (PMA) attached to the turbine rotating shaft. However, prior to the acceptance of power from the PMA an auxiliary power source must be used. Such a power source might be, for example, a battery. The usual mode of prime mover start-up is to connect the auxiliary power to the electric governor and watch the prime mover speed rise until such time that sufficient speed is generated to run the electric governor from the PMA. This might be easily accomplished through a push-button contact but it is still necessary to maintain constant watch over the turbine speed. Sometimes this could take as long as one half-hour. It therefore becomes desirable and consistent with modern technology to develop an automatic start-up system for a prime-mover equipped with an electric speed governor.

SUMMARY OF THE INVENTION

The present invention provides an automatic start-up circuit for a prime mover equipped with an electric governor. The start-up switch is energized which latches in a relay for connecting the auxiliary power to the electric governor. A first electronic circuit is provided for detecting speed pick-up failure. If this circuit indicated speed pick-up failure on start-up from zero speed, the auxiliary power supply is decoupled from the electric governor and the start-up is terminated. A second speed detection circuit indicates that the turbine speed is sufficient to allow the PMA to supply power to the electric governor. This then transfers the power supply from auxiliary power to PMA produced power.

The automatic start-up circuit has the following safety features. Speed pick-up failure and loss of auxiliary power will transfer the start-up power to the PMA. The start-up power is automatically transferred to the PMA at approximately 80% speed. If at any of the above cases the PMA cannot supply enough power (turbine too slow) or has failed the turbine control valves will close. This is significant since the PMA also provides the speed feedback to the electric governor, and if the auxiliary power were left switched in the prime mover could go to overspeed. After transfer to PMA power the unit cannot be returned to auxiliary power until the turbine has come to rest and a safety valve has been closed.

OBJECTS OF THE INVENTION

Is is one object of the invention to provide an electronic start-up circuit for a prime mover which will automatically shift from an auxiliary power supply to a shaft driven power supply for maintaining electrical speed controls.

It is another object of the present invention to provide an electronic start-up circuit which will detect speed pick-up failure.

The novel features believed characteristic of the present invention are set forth in the appended claims. The invention itself, however, together with further objects and advantages thereof, may best be understood with reference to the following description taken in connection with the drawings.

BRIEF DESCRIPTION OF THE DRAWINGS

FIG. 1 is a functional schematic showing the present invention as to organization and operation.

FIGS. 2A and 2B are electrical design circuit boards showing key components of the present invention.

DETAILED DESCRIPTION OF THE INVENTION

Figure 2A:
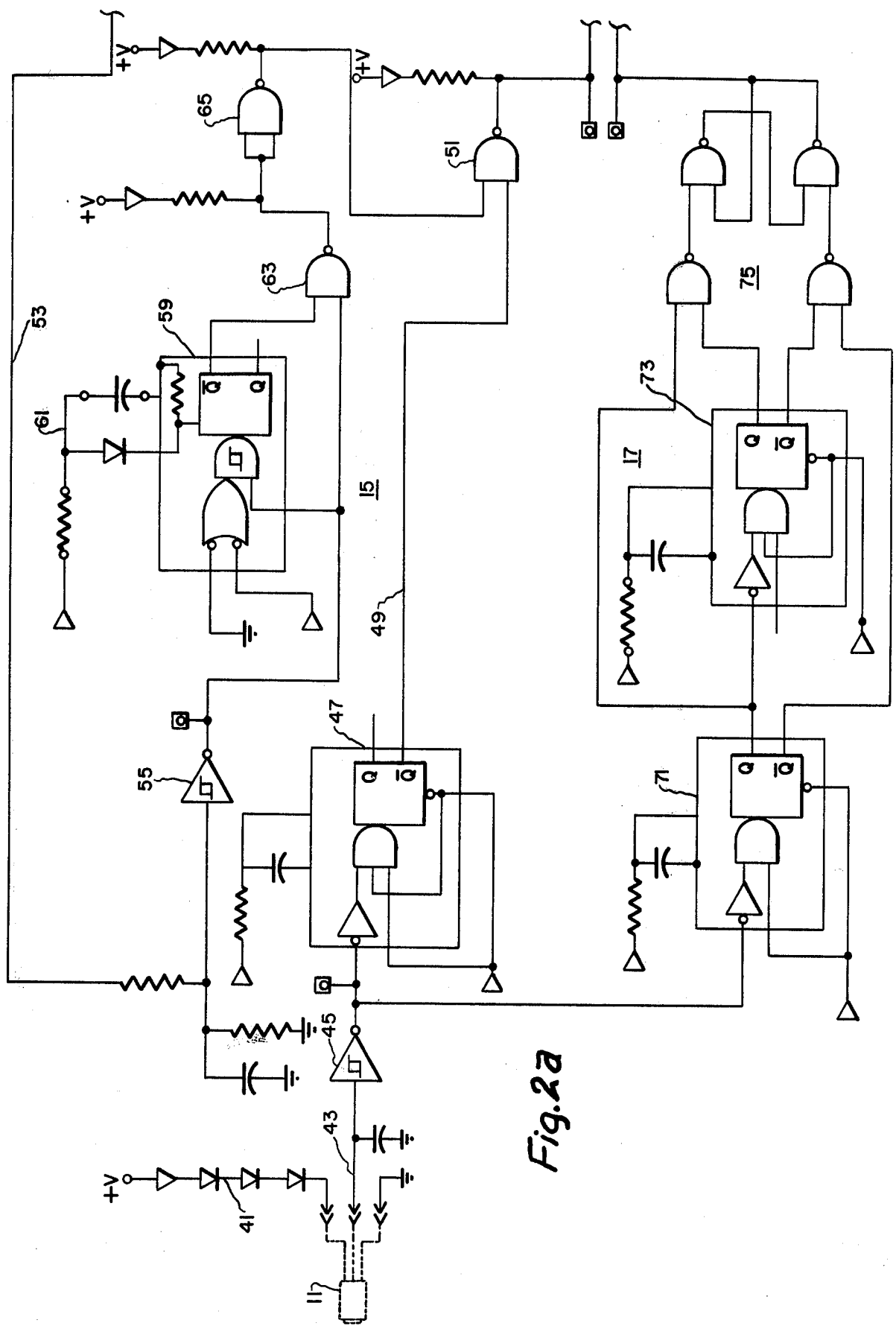

FIG. 1 discloses a functional schematic of the present invention. A speed pick-up 11 is positioned adjacent to a target 13 such as toothed wheel which is mounted on and driven by a prime mover shaft (not shown). The output of the speed pick-up is an electrical pulse train having a frequency proportional to turbine rotor speed.

A first output of the speed pick-up is input into a first speed detection circuit 15 which determines a low speed count. A second output of the speed pick-up is input into a second speed detection circuit 17 which determines a high speed count indicative of sufficient rotor speed to produce an adequate electrical output from a permanent magnet alternator (PMA) 19 to drive an electrical governor 21 which, in turn, positions a control valve 23 which admits motive fluid; e.g., steam into a prime mover (not shown) such as a steam turbine. The PMA is driven by the prime mover and hence the combination may become electrically self-sustaining after start-up.

On the other hand, during start-up the rotor speed may be insufficient to produce an adequate electrical output from the PMA to power the electrical governor and an auxiliary AC power source 25 must be supplied to the electrical governor. Such a power source may be a motor driven AC generator or a battery connected through a DC to AC converter circuit.

The switching decision is implemented through a relay K which controls switches A,B,C and D shown in their reset or start-up position. The relay K is actuated through start-up switch 29 which connects a voltage to ground through relay K and limit switch E. Limit switch E is used in the present invention to indicate that the trip throttle valve (not shown) is closed. The trip throttle valve is a normally open or close valve upstream from the control valve which provides back-up to the control valve. In the turbine start-up procedure, the trip throttle valve is initially closed. This is a safety precaution because if the electric speed governor is energized with the turbine below the governor low speed stop the control valves will go wide open. The trip throttle valve may therefore be used to bring the turbine up to control speed.

If the start-up switch 29 is actuated a signal is output on line 31 to set the first speed detection circuit which then determines within a preset time period whether the speed pick-up is operative. Actuation of the start-up switch then latches in relay K which then changes the state of switches A through D to the opposite of that shown. The relay K may then be de-activated upon subsequent failure of speed pick-up 11 or upon the turbine reaching self-sustaining PMA speed whichever occurs first. It is important to note that if relay K is deactivated the electric governor will look to the PMA 19 for electrical power. If there is insufficient power to the electric governor the control valves will close to trip the turbine but if there is sufficient power in the PMA then the governor will take over thus averting an unnecessary trip.

FIGS. 2A and 2B are a circuit board diagram of the present invention placed in sequential order. The speed pick-up 11 is energized through forward drop diode circuit 41 and provides an output of timed pulses on line 43. The frequency of the pulse train is proportional to the rotational speed of the turbine. The pulse train is input into a signal conditioning circuit or Schmitt Trigger 45 to square up and invert the pulses.

The circuitry which comprises the first speed detection circuit 15 includes a retriggerable monostable multivibrator circuit 47 having a $\bar{Q}$ output which responds to an input signal in the following manner. If there is no pulse output from the speed pick-up $\bar{Q}$ goes high. If there are pulses output from the speed pick-up $\bar{Q}$ goes low. Hence the output on line 49 indicates whether or not there are speed signal pulses. This becomes a first input to NAND gate 51.

A second input to NAND gate 51 is caused as follows. The initial condition FIG. 2B is trip throttle limit switch E closed and push button 29 being energized. Push button 29 also energizes relay K. Line 53 transmits a signal into Schmitt trigger 55 FIG. 2A indicating whether the trip throttle valve is opened or closed. If the valve is opened there will be a low input into Schmitt trigger 55 and a high output. If the valve is closed there is a high input into Schmitt trigger 55 and a low output. The output of Schmitt trigger 55 is input into a one-shot monostable multivibrator circuit 59 which includes time delay circuit 61. The time delay is usually about 3 seconds and the purpose is to give the turbine a chance to roll after the trip throttle valve is open and before the speed pick-up circuit is tested. The inputs into NAND gate 63 are 1,0 initially (valve closed), 0,1 (valve opens) and 1,1 after 3 seconds. This provides outputs from inverter 65 and inputs into NAND gate 51 of 0,0 and 1 respectively at valve close, valve open and valve open 3 seconds. This insures a high output from NAND gate 51 until 3 seconds or any other applicable time delay after the trip throttle valve opens. After that it is up to multivibrator 47, which remains low as long as there are pulses within a preset time constant and thereafter goes high if the pulses are not received within the time constant. This enables the speed pick-up to be constantly monitored after the initial time delay period when the trip throttle valve is opened.

The other relay drop out circuit or second speed detection circuit 17 includes retriggerable monostable multivibrator 71 followed by another retriggerable monostable multivibrator 73. A collection of NAND gates 75 follows which are connected to the outputs of the retriggerables 71 and 73 in a manner known by a person having ordinary skill in the art. Basically, the time constants of the retriggerables and the input of the pulse trains will result in a high input to NAND gate 77 if the rotor speed is below a preselected rotor speed. For example, it may be assumed that at 80 percent of rotor rated speed the PMA will be able to supply sufficient electrical output to run the electrical governor. If 80 percent of rotor rated speed is reached, the input into NAND gate 77 will go low.

There are two inputs into NAND gate 77. One input on line 81 indicates whether the speed pick-up is operative whereas the other input on line 83 indicates whether a preselected percent of rated speed has been reached. A high output on line 85 will de-energize relays K1 and K2 causing the governor to seek power from the PMA. A low output on line 85 will keep the auxiliary power in line to the governor and the relays energized.

A low signal on line 81 will result in an abnormal transfer from auxiliary power to the PMA indicative of speed pick-up failure. A low signal on line 83 will result in a normal transfer from auxiliary power to the PMA indicative that normal control speed has been reached by the turbine and the PMA has been switched. Indicator lights 91 are provided to show the operational status of the start-up circuitry. Manual switch 93 has been included as a by-pass to the invention as shown.

With reference to FIGS. 1, 2A and 2B, the operation of the invention is as follows. The circuitry is initialized by closing the trip throttle valve and pushing automatic start switch 29. As the trip throttle valve opens, the output of NAND gate 51 is kept high through delay timer 15 for a period of three seconds. This means that even if no pulses are detected from the speed pick-up the auxiliary power will be connected through relay K which latches in if the automatic start button is pressed and the trip throttle valve is closed. After three seconds, the NAND gate 51 is set-up to go output low if the speed pulse input is discontinued. A low output would result in an abnormal transfer of power to the PMA. If the PMA is unable to sustain the electric governor the turbine control valves will go closed.

The input to NAND gate 77 from the second speed detection circuit will go high to low when 80 percent speed is reached. This will cause a normal transfer of power from auxiliary to PMA power and result in the electric speed governor taking charge.

While there has been shown what is considered to be the preferred embodiment of the invention, it is also understood that other modifications may be made therein. It is intended to claim all such modifications as fall within the true spirit and scope of the invention.

What is claimed is:

1. An electronic switching circuit for supplying electrical power to a prime mover electrical governor wherein one source of electrical power to the electrical governor is an electrical generator driven by the prime mover and the other source of electrical power is an auxiliary power supply to be connected to the electrical governor during prime mover start-up, said electronic switching circuit comprising:
    speed pick-up means for tracking prime mover rotor speed;
    a first speed detection circuit connected to said rotor speed pick-up for determining a low speed count;
    a second speed detection circuit connected to said rotor speed pick-up means for determining a satisfactory rotor speed switching count; and,
    a relay connected to the outputs of said first and second circuits whereby either a low speed count or a satisfactory switching count will transfer the electrical power source from auxiliary power to electrical generator power.

2. A start-up switch circuit for a prime mover of the type having an electrical speed governor driven alternatively by an external power source or an internal power source wherein the latter includes a rotor mounted electric generator, said start-up circuit comprising:

speed pick-up means for tracking prime mover rotor speed;

a first speed detection circuit connected to said rotor speed pick-up means;

a timing circuit for delaying the implementation of the first speed detection circuit to allow for system starting inertia;

a second speed detection circuit connected to said rotor speed pick-up means for determining a minimum rotor speed; and, a relay connected to the outputs of the first and second circuits whereby either a low speed count or a minimum speed will switch the power source from external to internal.

3. The start-up circuit recited in claim 2 further comprising a first NAND gate receiving inputs from said first speed detection circuit and said timing circuit whereby upon reset, the input from the timing circuit occurs for a preset minimum period after which the speed pick-up is automatically tested.

4. The start-up circuit recited in claim 3 further including a second NAND gate receiving inputs from said first NAND gate and said second speed detection circuit whereby a low signal input from the first NAND gate will cause an abnormal transfer to internal power whereas a low signal input from the second speed detection circuit will cause a normal transfer to internal power.

5. A start-up circuit for a prime mover of the type having an electric speed governor powered by either an external power source during start-up or an internal rotor mounted power source during normal operation, said start-up circuit comprising:

speed pick-up means for tracking prime mover rotor speed;

a first speed detection circuit connected to said rotor speed pick-up including a retriggerable monostable multivibrator for determining a low speed count;

a second speed detection circuit connected to said rotor speed pick-up including a pair of retriggerable monostable multivibrators for determining a high speed count;

a relay connected the outputs of said first and second speed detection circuits, said relay causing a switch from external to internal power whenever the respective detected speeds are below or above preselected values indicative of pick-up failure or sufficient rotor speed respectively.

6. The start-up circuit recited in claim 5 further comprising:

means indicative of a preset valve close condition; and a timer circuit including a one-shot multivibrator circuit set by said valve close condition; the output of said timer circuit being gated with the output of said first speed detection circuit.

7. The start-up circuit recited in claim 6 including first and second switches connected to said relay and to said internal and external power supplies between said power supplies and said electric governor respectively.

* * * * *